United States Patent [19]
Takahashi et al.

[11] Patent Number: 5,345,782
[45] Date of Patent: Sep. 13, 1994

[54] FLOW-TYPE ICE MANUFACTURING MACHINE

[75] Inventors: Kazuhiro Takahashi, Ootashi; Yoshiharu Abe, Fujioka; Hideyuki Katayanagi, Tatebayashi, all of Japan

[73] Assignee: Sanyo Electric Co., Ltd., Osaka, Japan

[21] Appl. No.: 21,842

[22] Filed: Feb. 23, 1993

[30] Foreign Application Priority Data

Feb. 25, 1992 [JP] Japan .................. 4-073205
Feb. 28, 1992 [JP] Japan .................. 4-078443
Feb. 28, 1992 [JP] Japan .................. 4-078444
Mar. 9, 1992 [JP] Japan .................. 4-085070

[51] Int. Cl.[5] ............................................. F25C 1/12
[52] U.S. Cl. ................................. 62/344; 62/347
[58] Field of Search ............................ 62/347, 344

[56] References Cited

U.S. PATENT DOCUMENTS 3,009,336 11/1961 Bayston et al. .......... 62/347 X
3,021,686 2/1962 Alt ............................. 62/347 X
4,572,785 2/1986 Braaten ..................... 62/347 X
4,722,199 2/1988 Hibino ....................... 62/344

OTHER PUBLICATIONS

Metals Handbook, Ninth Edition, 1983, published by the American Society for Metals.

Primary Examiner—William E. Tapolcai
Attorney, Agent, or Firm—Armstrong, Westerman, Hattori, McLeland & Naughton

[57] ABSTRACT

A flow-type ice manufacturing machine includes substantially vertical ice making panels and equipped with a cooling pipe secured on the back of the ice making panels for cooling circulating water that flows on the ice making surfaces. The ice manufacturing machine comprises an ice storage chamber for storing ice, the chamber having a front door, a machinery room for accommodating a condensation unit, the machinery room mounted on the upper front end of the ice storage chamber, and an ice making portion mounted behind the machinery room, so that the ice produced drops into the ice storage chamber and heaps deeply in the chamber, thereby preventing the ice from spilling from the door when it is opened or forcing the door to open unexpectedly. A ice level sensor is mounted on the rear wall of the ice storage chamber so that the sensor is not liable to damage by the users' scooping operation, yet the sensor is capable of accurately detecting the amount of the ice stored in the chamber, thereby providing improved control of the ice manufacturing operation.

2 Claims, 13 Drawing Sheets

FLOW-TYPE ICE MANUFACTURING MACHINE

FIELD OF THE INVENTION

The invention relates to a flow-type ice manufacturing machine having substantially vertical cooling panels on which ice is formed from circulating source water that flows thereon.

BACKGROUND OF THE INVENTION

A typical flow-type ice manufacturing machine utilizing circulation of water on cooling panels is disclosed in Japanese Patent Early Publication No. 62-141478. Such machine will be referred to as flow-type ice manufacturing machines.

The above publication teaches an ice manufacturing machine having an ice making unit consisting of a condenser unit and a refrigeration portion. The ice making unit is mounted on an ice storage portion. The ice storage portion has a machinery room for the ice making unit at the upper rear end of the storage portion, and the refrigeration portion in front of the ice storage portion. FIG. 12-14 shows ice manufacturing machine having the essentially same structure as disclosed in the above publication.

A typical ice manufacturing machine will be outlined below with reference to FIG. 12, since those machines shown in FIGS. 12-14 are essentially the same in structure. An ice engine or ice making portion 1 has a pair of ice making panels 2 having waving surfaces, a cooling pipe 3 mounted on the back sides of the ice making panels 2, a source -source water sprinkler 4, an ice removal sprinkler 5 for sprinkling water to remove the ice formed on the ice making panels 2, and a water circulation system 9 for circulating water in a tank 7. The tank 7 serves as a reservoir for receiving and storing water which has run down on the ice making panels 2 and falling into a conduit 5. The water stored in the tank 7 is pumped by a pump P back to the source-water sprinkler 4 to be sprinkled again by the source water sprinkler 4. Provided in a machinery room 11 is a condenser unit 17 which includes such elements as an electrically driven compressor 13 connected with the cooling pipe 3 and a coolant tube 12 to form a cooling cycle, a condenser 14, a condenser fan 15, and a capillary tube 16. Also provided in the machinery room 11 is an electric instrumentation box 18 accommodating a controller for controlling the operation of the cooling cycle as well as the operation of a water supply unit for the ice making portion 1. Also provided in the machinery room 11 are a hot gas circuit which has a hot gas valve 19 for use with the cooling cycle, and a water supply tube 22 which has a water supply valve 21. The ice making portion 1 and the machinery room 11 are partitioned by a thermal insulation partition 24. The ice making portion 1 is covered with a thermal insulation cover 25. The cover 25 has openings in its bottom and rear portions.

An ice storage chamber 27, covered with a thermal insulation wall, has a front opening 28 having a door 29. The ice may be taken out from this door 29. The front door 29 is provided with a door mask 30 on the back thereof. An ice guide 32 is provided in the ice storage chamber 27 for guiding ice pieces i dropping from the ice making portion 1 into the ice storage portion 27A. An ice level sensor 38b (which is of a thermostat type) is mounted on either side walls of the ice storage chamber 27 for detecting the amount of the ice stored in the ice storage portion 27A and for generating signals required in controlling the operations of the cooling cycle and water supply unit. A door mask stopper 34 is mounted on the upper edge of the front opening 28.

Unfortunately, the machine shown in FIG. 12 has several disadvantages. First, it stores ice pieces i heaping in the ice storage chamber 27 as outlined by a shaded line "a". However, the ice pieces i at the top of the heap would fall on the front door 29, forcing the front door 29 to open or spill when the door 29 is opened.

In order to prevent such problems as discussed above, it is necessary to provide an ice guide 82 for guiding the ice pieces i falling from the ice making portion 1 to rear slope of the heap, or to provided a door having more resistive power against the pressure of the ice pieces i.

Such ice guide 32, however, induces another problem that it blocks the movement of a scoop taking up ice in the storage area 27A.

Second, the ice level sensor 33b mounted on the side wall near the front opening 28 can be easily damaged by a user's scoop hitting sensor 33b.

One might think, an attempt to avoid damaging the ice level sensor 33b, that it may be substituted for by an infrared type ice level sensor 33c mounted on the lower rear surface 27b of the ice storage chamber 27, as shown in FIG. 13. Such ice level sensor 88c, however, would be inadequate to detect the true amount of the ice i in the ice storage chamber 27, because, as shown in FIG. 14, the ice level sensor 33c would detect an apparent level of ice not indicative of the true amount thereof, and hence fails to resume ice making operations.

Third, a further disadvantage can arise in connection with the structure of such flow-type ice manufacturing machine as described above. In the case of flow-type ice manufacturing machine, it has two major portions, i.e. the ice storage chamber and the ice making portion mounted on top of the ice storage chamber. The ice storage chamber and the ice making unit (portion) have flat top surface and flat bottom surface, respectively, and the ice storage chamber is secured to the ice making unit (portion) by means of coupling members (such as mounts 18 as shown in FIG. 2 of the publication) and screws tightened horizontally (such as screws 15 shown in FIG. 2 of the publication). Use of such extra coupling members and screws, however, increases the total number of elements of the machine and add structural complexity to the flow-type ice manufacturing machine. Further, the top surface of the ice storage chamber is not necessarily secured to the ice making unit (portion)in the vertical direction.

Japanese Patent Early Publication No. 1-200168 discloses a specific structure of an ice making unit(portion). This unit has ice making panels having waving surfaces for making ice (hereinafter referred to as ice making surfaces) with their crest portions and trough portions extending horizontally, and a cooling pipe vertically zigzagging on the back side of the ice making panel. As the ice making surface is supplied with water from a source-water sprinkler, the water freezes on the recessed portions or trough portions of the panels. The ice thus formed is liberated from the ice making panels by the heat given off by a hot gas passed temporarily in the cooling pipe and ice removing water supplied by an ice removal sprinkler to the ice making panels.

Any highly efficient flow-type ice manufacturing machine must be capable of making sufficient amount of uniform ice pieces in one single short ice making operation. In order that a flow-type ice manufacturing machine satisfies such criteria, it must allow the ice making water to flow uniformly and smoothly in contact with the ice making surface. It is also important that the ice removing water must flow on the inner surfaces of the ice making panels. In addition, it is important that the cooling pipe is in good contact with the ice making panels to establish good heat transfer between them.

Further, the ice formed on the ice making panels must be easily liberated. All these conditions must be met for realization of a satisfactory ice making unit (portion) for use with a flow-type ice manufacturing machine.

Therefore, there is a need of ice making unit having improved efficiency for use in flow-type ice manufacturing machines.

A further improvement in the efficiency may be attained by providing a control system that has accurate response to the amount of the ice stored in the storage chamber, so that ice making operations are promptly resumed as the amount if the ice decreases to a specified level.

One type of control system intended for such purpose as mentioned above is disclosed in Japanese Utility Model No. 54-15351. This control system involves an ice storage chamber for receiving and storing ice discharged from its ice making engine. The ice storage chamber has an electrically grounded metal case (which can be an inner/outer box of the ice storage chamber) serving as a first electrode, and an electrically insulated ice level sensor mounted on the inner wall of the ice storage chamber serving as a second electrode. These two electrodes and the space between them constitutes an electric capacitor. Its electric capacity varies with the amount of the ice stored in the ice storage chamber. The change in capacitor is transformed into an electric signal, which is applied to a control circuit controlling the operation of the ice manufacturing machine.

It is important that the ice level sensor is electrically insulated from other elements such as conductive frames of the ice storage chamber so that the change in capacitor takes place only when the ice heaps up to a predetermined level in the ice storage chamber to touch the sensor.

This type of sensors, however, have drawbacks in that their electrodes can be electrically short-circuited by dust and deposit accumulating between the electrodes, thereby resulting in erroneous control signals. As such the sensor is desirably mounted physically off the case, which is, however, difficult to do.

SUMMARY OF THE INVENTION

An object of the invention is, therefore, to provide an improved flow-type ice manufacturing machine that is capable of storing sufficient amount of ice without spilling the ice when its door is opened.

Another object of the invention is to provide a flow-type ice manufacturing machine whose ice making portion and ice storage chamber are easy to assemble in a compact and yet rigid unit, thereby rendering its manufacturing cost low.

A further object of the invention is to provide an ice making unit for use in a flow-type ice manufacturing machine, having improved durability (i.e. anti-corrosive properties), good low-temperature performance, and reliability in performance.

A still further object of the invention is to provide a flow-type ice manufacturing machine having an ice sensor that is not susceptible to damage during ice removal by the user, thereby ensuring stable operation of the ice manufacturing machine.

The invention concerns a flow-type ice manufacturing machine including substantially vertical ice making panels having ice making surfaces and equipped with a cooling pipe secured on the back sides of the ice making panels for cooling circulating water flowing on the ice making surfaces. In view of the above objects, a flow-type ice manufacturing machine of the invention comprises: an ice making room for accommodating the ice making panels and the source-water sprinkler mounted above the ice making panels; a machinery room for accommodating a condensation unit connected with the cooling pipe to form a cooling cycle; and an ice storage chamber for storing the ice formed by the ice making panels. The ice storage chamber has a front door for providing users with access to the ice. The machinery room is mounted on the upper front end of the ice storage chamber and the ice making chamber is mounted on the upper rear end of the ice storage chamber.

It should be noted that the ice making portion is located over the ice storage chamber and behind the machinery room. Ice pieces dropping from the ice making portion, therefore, accumulate deep inside the ice storage chamber, not near the door, thereby avoiding pushing the door to open or preventing the door from closing. Thus, the drawbacks pertinent to conventional flow-type ice manufacturing machines as mentioned above may be eliminated.

Since no conventional ice guide is necessary, there is nothing to block user's ice picking operation. The user may have easy access to the stored ice.

In another aspect of the invention, a flow-type ice manufacturing machine includes: an ice making portion in an ice making room, which portion comprises substantially vertical ice making panels, a cooling pipe secured on the back sides of the ice making panels, and a water sprinkler mounted above said ice making panels; a condensation unit provided in a machinery room for cooling said ice making portion; a thermally insulated ice storage chamber for storing therein ice made by said ice making portion; and a thermal insulation partition for thermally insulating the condensation unit from the ice making portion and the ice storage chamber, and is characterized in that:

the ice storage chamber has step portions on the insides of the upper ends of opposing walls;

the condensation unit is mounted on the base portion of the thermal insulation partition;

the ice making unit is mounted behind the thermal insulation partition; and the base portion of the thermal insulation partition is securely fitted in the step portions.

With this construction the condensation unit is thermally insulated from the ice making portion and the ice storage chamber by a thermally insulating partition to form an ice making unit. The ice making unit is securely mounted on top of the ice storage chamber by means of screws so that they may be firmly coupled. The ice manufacturing machine has thus good thermal insulation and is easy to assemble, compact and rugged in structure. It should be noted, however, that the ice storage chamber may be manufactured independently of the ice making unit.

The top end of the ice storage chamber may be provided with step portions which receive the ice making unit in position. The stepped portions may be formed during manufacture of the inner box of the ice storage chamber. It should be apparent that the ice making unit has a design which leaves a large part of the top opening of the ice storage chamber for the ice making portion mounted behind the ice making unit so that ice pieces released from the ice making portion may freely fall into the storage chamber through that part of the opening.

In a further aspect of the invention, a flow-type ice manufacturing machine includes: ice making panels having horizontally extending crest portions and recess portions alternately spaced apart by a predetermined distance in vertical direction so as to allow formation of ice in the recess portions; a cooling pipe zigzagging in vertical direction and soldered on the back sides of the ice making panels; a source-water sprinkler mounted above the ice making panels; and an ice removal sprinkler mounted at an upper position of the ice making panels, and is characterized in that: the recess portions each have upper and lower surfaces such that the lower surfaces thereof are inclined with respect to a horizontal plane at an angle greater than the angle of inclination of the upper surfaces; and the solder contains silver as an additive.

It is noted that a recess portion or trough portion is formed between two successive horizontal crest portions, where water flows in and freezes to make an ice piece having the same cross section as the recess.

It should be appreciated that the lower upward wall of each recess portion has a flat face which is inclined at an angle so as to easily free the ice pieces formed in the recess. The upper downward face of the recess is also inclined at an angle appropriately so that water may smoothly flow past the crest above it and be led into the recess, thereby ensuring the uniform formation of ice pieces in each recess.

In the ice making portion the ice removing water may also flow smoothly.

The cooling pipe is soldered to the ice making panels. The solder used for this purpose contains minute concentration of silver, which is hygienically safe. The solder is non-corrosive, durable, and provides strong bonding. Further, it has good heat transfer coefficient at low temperatures, and is suitable in ensuring reliable performance of the ice making portion.

In a still further aspect of the invention, a flow-type ice manufacturing machine may further comprise an ice level sensor mounted on the rear wall of the ice storage chamber for controlling the ice making operation of the ice manufacturing machine in accordance with the amount of the ice stocked in the ice storage chamber.

In a still further aspect of the invention, a flow-type ice manufacturing machine includes: an ice making portion; a condensation unit for cooling the ice making portion; an ice storage chamber for storing the ice made by the ice making portion; a thermal insulation cover removably mounted on the ice storing chamber to cover the ice :making portion; and a capacitor type ice level sensor for detecting a predetermined amount of ice stored in the ice storage chamber to generate a control signal required for ice making operations, characterized in that a space is formed between connecting portions of the cover and of the ice storage chamber; a portion of internal wall of the ice storage chamber is made of electrically non-conductive material and is provided with an inwardly protruding portion; and the ice level sensor is mounted on the protruding portion.

As a further improvement to this flow-type ice making machine, the lower end of the cover may have a depending portion extending downwardly along the inside of the ice storage chamber, and the ice level sensor may be mounted on the depending portion.

This arrangement will prevent functional degradation of a capacitor type ice level sensor due to deposit formed on the sensor.

Because of the arrangement of the ice making unit, ice pieces heaps rather deep in the chamber (with its apex deep in the ice storage chamber). As a result the ice level sensor, if mounted on the rear wall of the storage, may detect shortage of ice in the storage chamber and promptly instruct the controller to resume production of required amount of ice. It should be appreciated that the ice level sensor is not liable to damage caused by a scoop, since it is mounted at far end of the storage chamber.

The capacitor-type ice level sensor, when mounted on the depending portion, may be positioned off the walls of the ice storage chamber. In addition, the fact that the removable case is connected with the ice storage chamber with a space between them and that the ice level sensor is separated from the ice storage chamber wall prevents unwanted electrical short-circuit by the deposit accumulating between the sensor and the ice storage chamber, thereby ensuring normal ice detection operation.

It should be also noted that the installation of the ice level sensor requires no further material to electrically insulate it from the ice storage chamber, and that the installation is easy.

DETAILED DESCRIPTION OF THE PREFERRED EMBODIMENT

Figure 12:
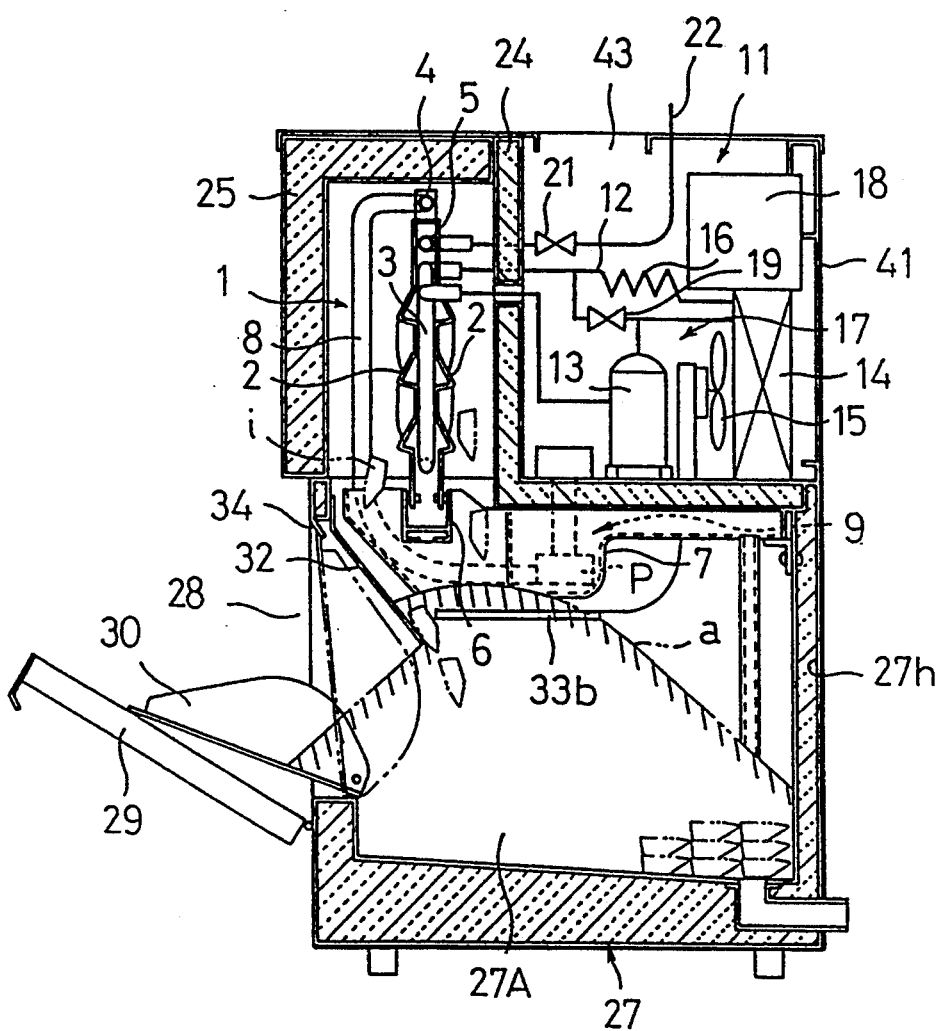
FIGS. 12 and 13 are vertical cross sections of conventional flow-type ice manufacturing machines having an ice making portion at their front end and a machinery room at their rear ends.
Figure 13:
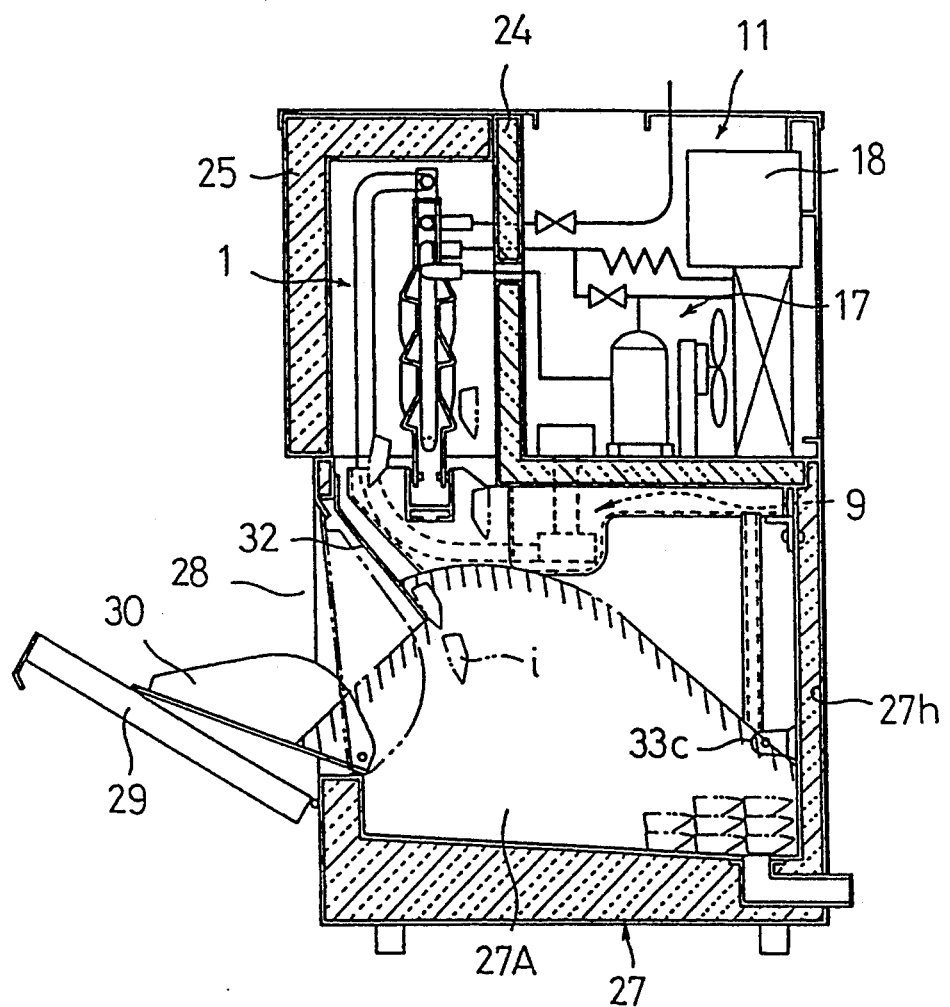
Figure 14:
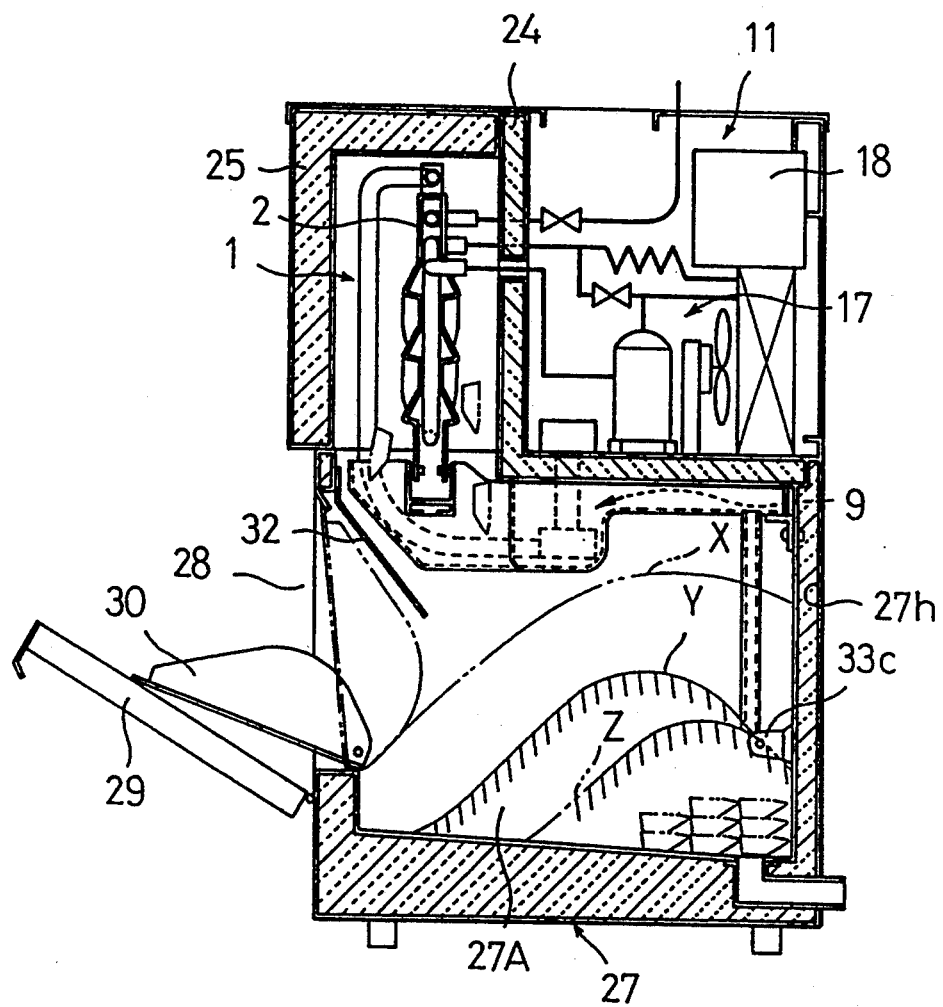
FIG. 14 is a vertical cross section of the flow-type ice manufacturing machine shown in FIGS. 12 and 13, illustrating how the ice level sensor can sense erroneous amount of ice in the ice storage chamber.

A first example of the invention will be now described by way of example with reference to the accompanying drawings, in which those elements which are functionally the same as, or equivalent to, the conventional elements in the flow-type ice manufacturing machine shown in FIGS. 12 through 14 are referred to by the same reference numbers.

Figure 1:
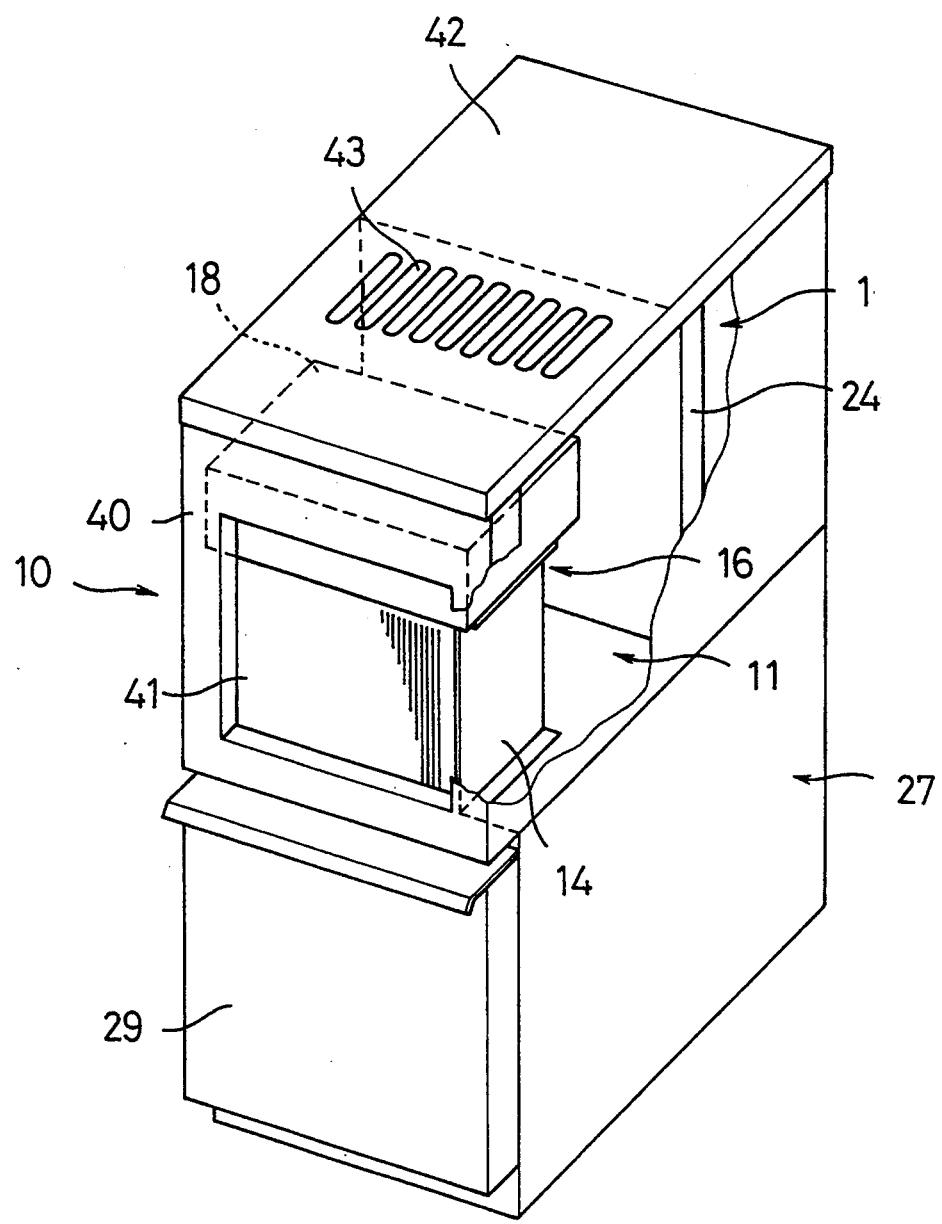
FIG. 1 is a perspective view of a first flow-type ice manufacturing machine according to the invention.
Figure 2:
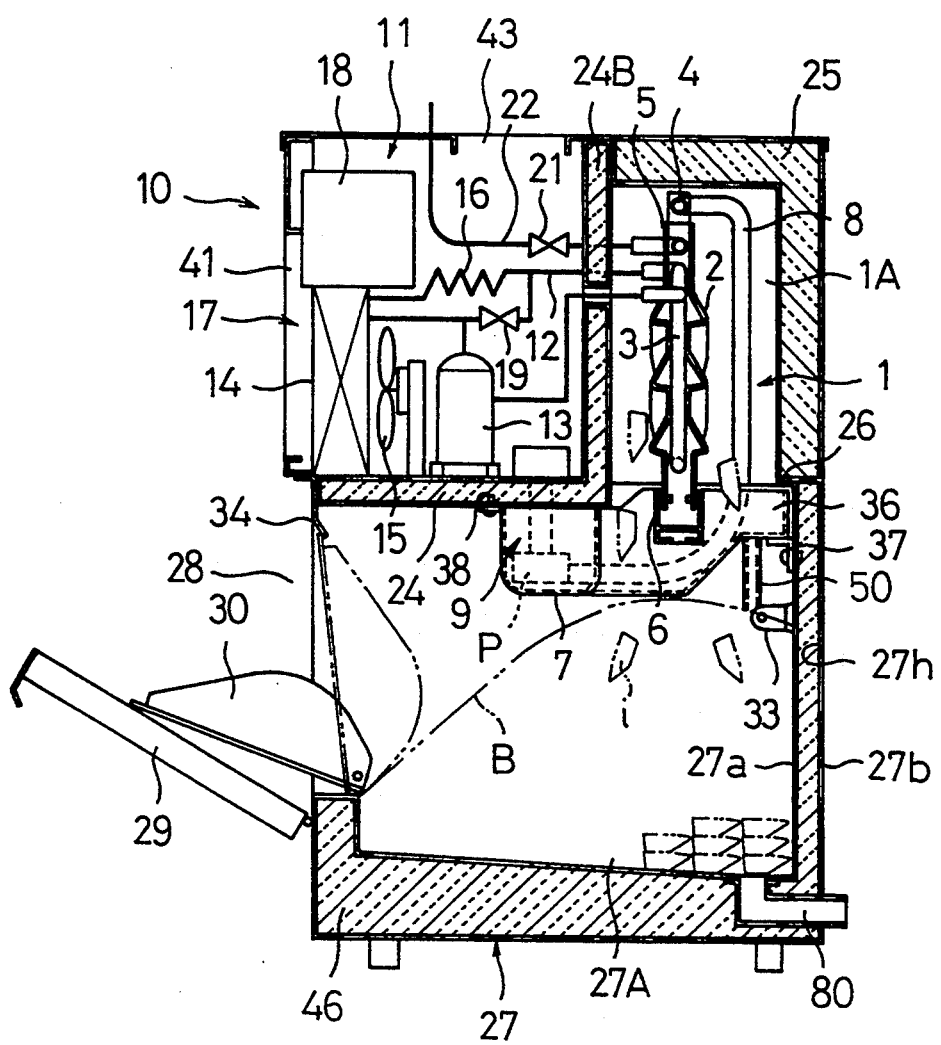
FIG. 2 is a vertical cross section of the machine shown in FIG. 1.
Figure 3:
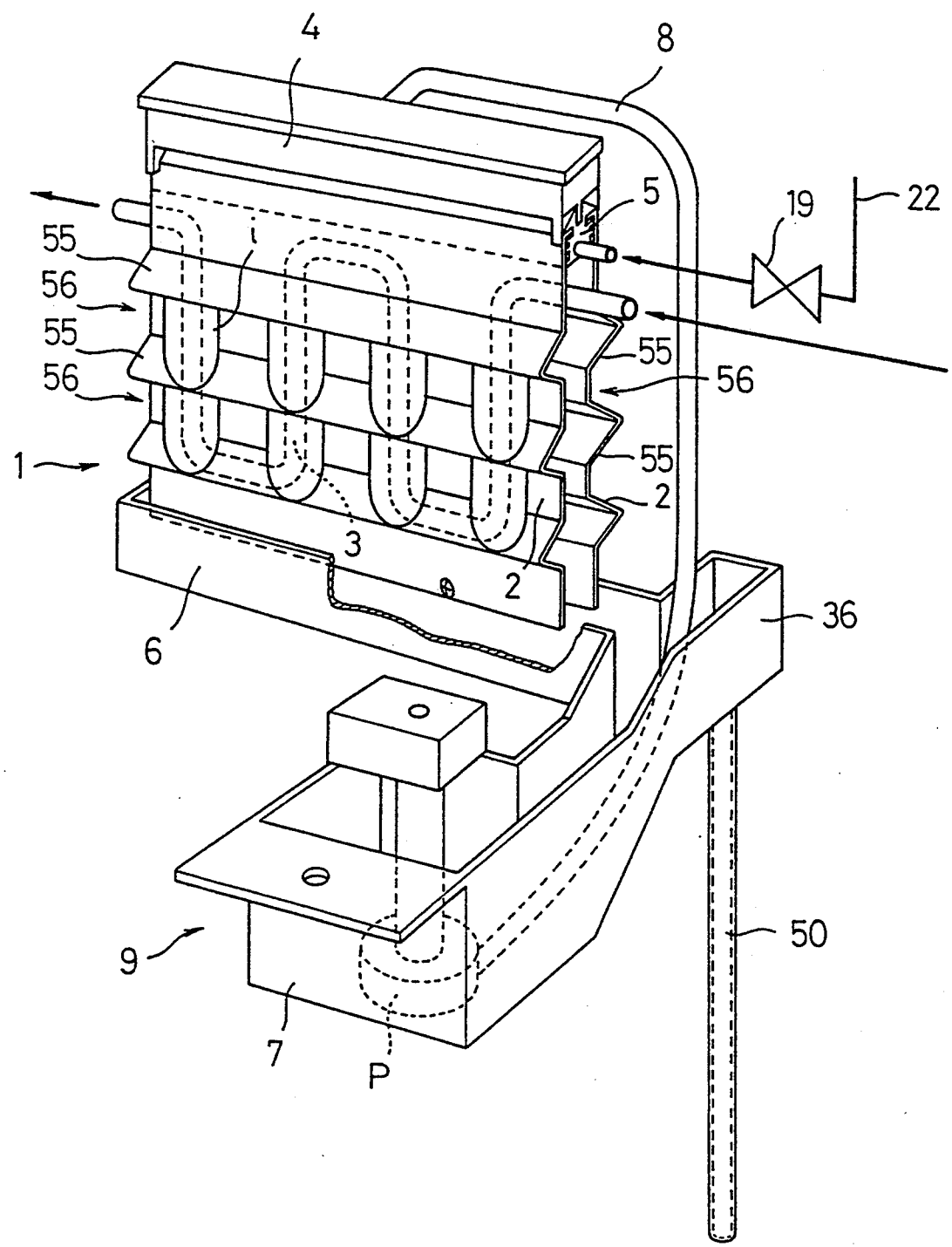
FIG. 3 is a perspective view of the ice making portion of the apparatus shown in FIG. 1.

Referring to FIGS. 1, 2, and 3, there are provided an ice making unit 10 which is mounted on top of a chamber 27. The ice storage chamber 27 has a front door 29. The ice making unit 10 includes a machinery room 11 and an ice making portion 1, and is mounted on the upper front end of the ice storage chamber 27. The ice making portion 1 is located behind machinery room 11.

Accommodated in the machinery room 11 are a condenser unit 17 which includes such components as compressor 13 driven by an electric motor, a condenser 14, condenser fan 15 and capillary tube 16 all together sequentially connected by a coolant tube 12 and a cooling pipe 3 to form a cooling cycle. Also accommodated in the machinery room 11 are: an electric instruments box 18 which houses a controller for controlling the operation of the cooling cycle and the water supply system for the ice making portion 1; a hot-gas circuit having a hot-gas valve 19 provided in the cooling cycle; and water supply tube 22 having a water supply valve 21.

The ice making portion 1 comprises a zigzag portion of the cooling pipe 3, which, together with the condensation unit 17, constitutes the cooling cycle as described above.

The ice making portion 1 is mounted on a vertical wall of a thermal insulation partition 24 which thermally insulates the ice making portion 1 from the machinery room 11. The condenser unit 17 is mounted on the horizontal base portion of the partition 24.

A water receiver 36 (FIG. 3) is formed integral with a water tank 7 and a water conduit 6 serving as a part of a water circulation system 9, and is secured at one end thereof to a supporting member 37, FIG. 2, at the top of a rear wall 27b of the ice storage chamber 27. The other end of the water receiver 36 is firmly secured on the base of the thermal insulation partition 24 by a screws 38. An over-flow hose 50 is formed integrally with the water receiver 36.

In this manner the ice making portion 1, the water circulation system 9, and the condenser unit 17 are all mounted on the thermal insulation partition 24 to form the ice making unit 10. The ice making unit 10 thus formed is mounted on the ice storage chamber 27 such that the ice making unit 10 covers the upper opening of the ice storage chamber 27. The manner in which the ice making unit 10 is combined with the ice storage chamber 27 to form a flow-type ice manufacturing machine will be described in detail in connection with a second example of the invention.

An ice level sensor 33 is mounted at an appropriate height on the rear wall portion 27h of the ice storage chamber 27. A front panel 40 and a ceiling panel 42 of the outer panels for covering the machinery room 11 have an air inlet port 41 and an air outlet port 43 for exhausting the air heated by an heat exchanger, respectively.

In this arrangement ice pieces produced are liberated from ice making panels 2 and drop to the opposite sides of the water conduit 6, and heap as shown in FIG. 2 by a double-dot line B. The apex of this heap is formed away from the door 29, so that ice pieces will not spill out of the ice storage chamber 27 if the door 29 is opened.

Since the front door 29 is not subjected to the pressure of the ice from inside of the ice storage chamber 27, it will not be opened unexpectedly. Further, since no conventional ice guide 32 is provided, there is a large room in the front opening 28 of the ice storage chamber 27 for a user scooping ice pieces therein.

When the heap lowers to a certain level due to scooping of the ice by a user, the ice level sensor 33 will promptly detect the level and re-start ice manufacturing operation. The amount of the ice in the ice storage chamber 27 is thus controlled optimally.

Referring to the FIGS. 1 through 5, a second example of the invention will be now described.

As would be understood from the preceding discussion, a flow-type ice manufacturing machine consists essentially of an ice making unit 10 and an ice storage chamber 27.

Figure 4:
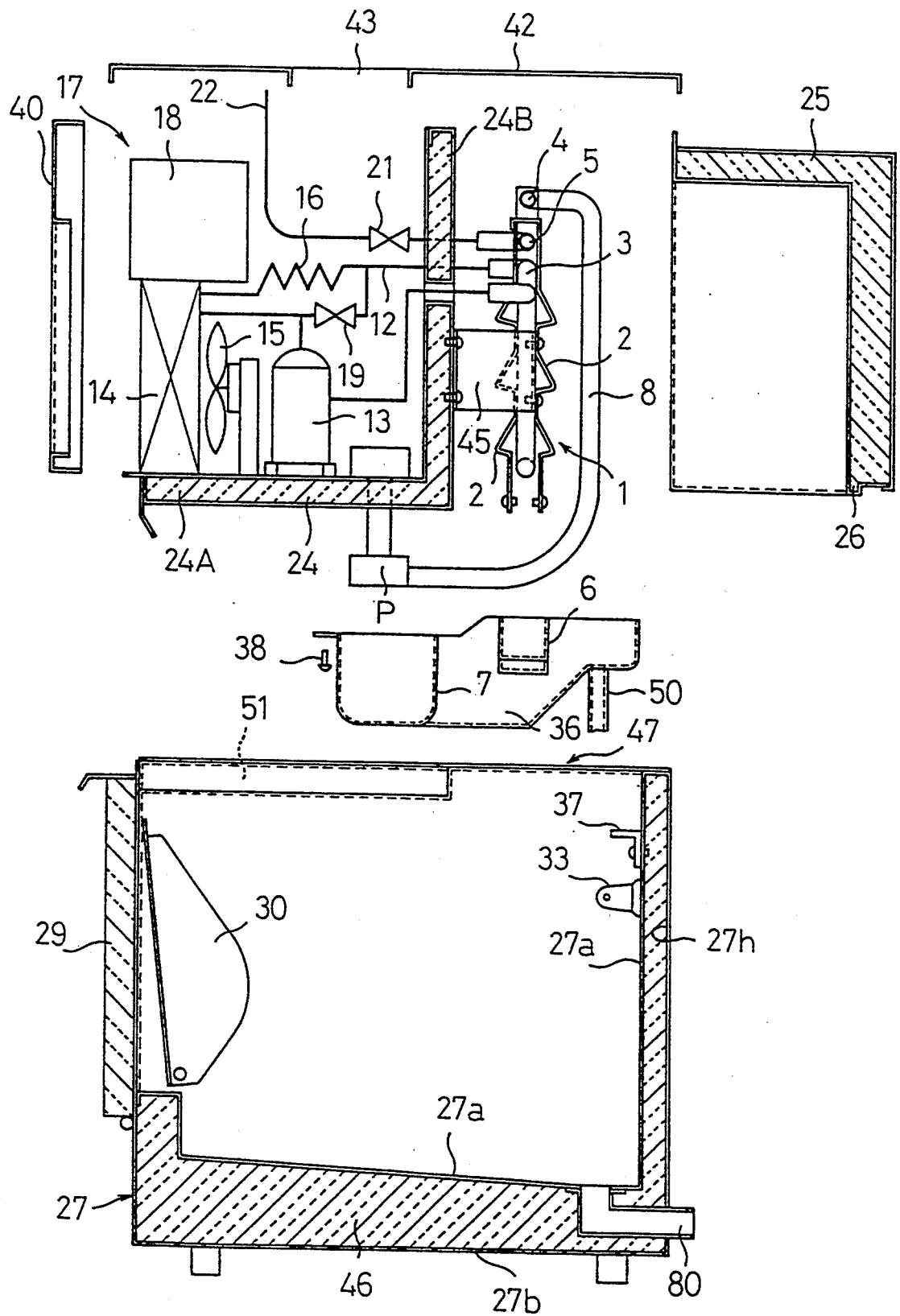
FIG. 4 shows an exploded view of the flow-type ice manufacturing machine of FIG. 1.
Figure 5:
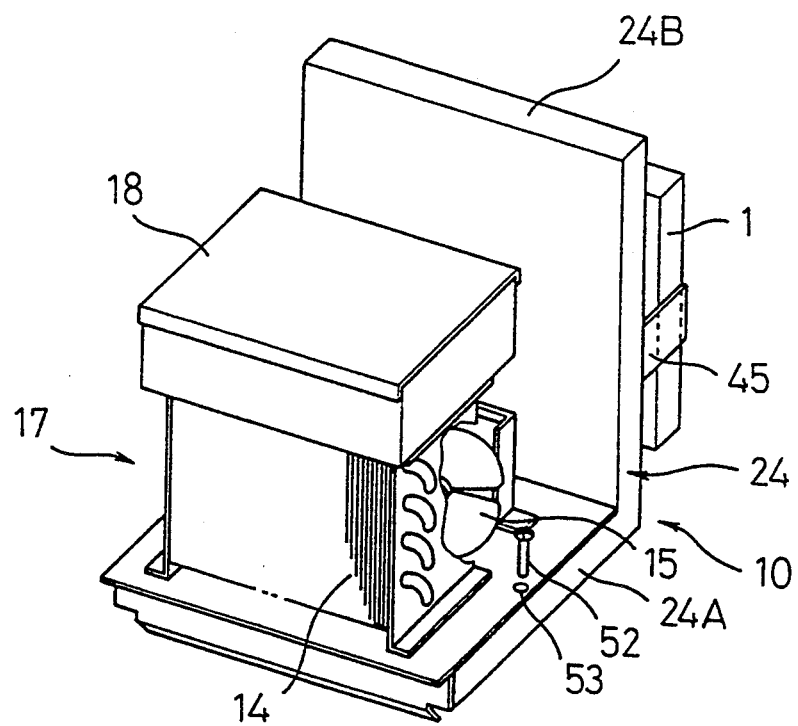
FIG. 5 shows perspective views of the ice making unit and the ice storage chamber before they are assembled.
Figure 5:
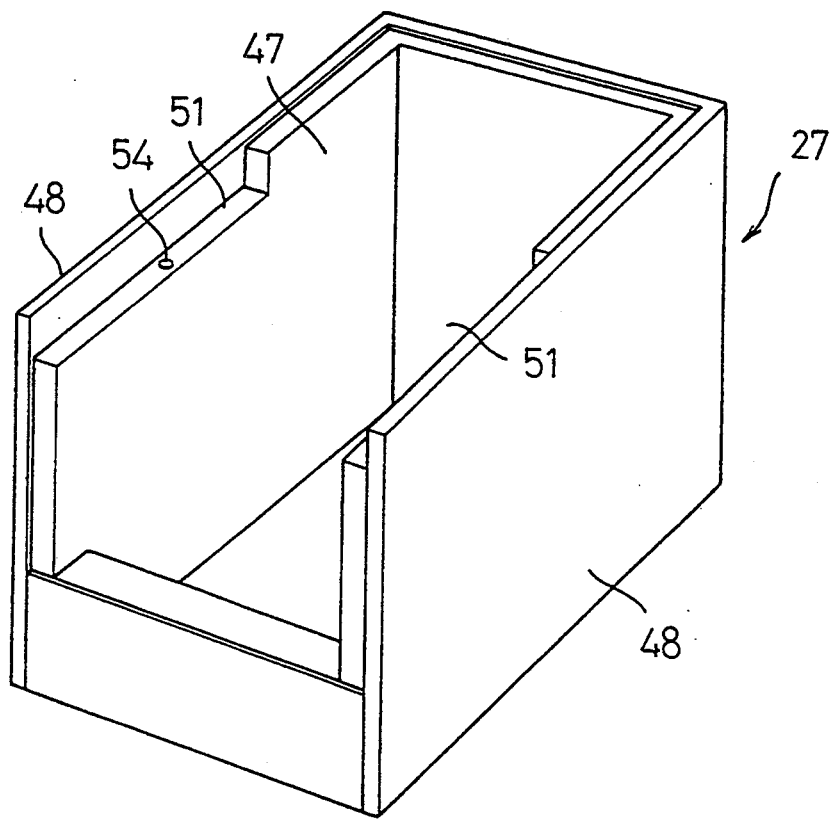

Such ice making unit 10 includes an ice making portion 1 and a condenser unit 17 mounted on a thermal insulation partition 24 having a base 24A and a vertical wall 24B formed at one end of the base 24A, as shown in FIGS. 4 and 5. These walls are made of a thermal insulation material.

The condenser unit 17 and an electric instrumentation box 18 are mounted on the base 24A of the thermal insulation partition 24, while the ice making portion 1 is mounted, by means of mounting member 45, on the wall 24B. The ice making portion 1 is connected with a coolant tube 12 and a water supply tube 22 across the wall 24B. Thus, the condenser unit 17 and the ice making portion 1 are mounted on the thermal insulation partition 24 to form the integral ice making unit 10. A water receiver 36 is mounted later on the base 24B.

A thermal insulation cover 25 for covering the ice making portion 1 has a bottom opening as well as a front opening. Formed on the lower end of the thermal insulation cover 25 is a flange portion 26 extending downwardly and inwardly from the upper end of the inner box 27a of the ice storage chamber 27. The function of the flange portion 26 will be described later. A ceiling panel 42 extending over the machinery room 11 is mounted on the upper end of the thermal insulation cover 25. An air intake port 41 is formed in a front panel 40 of the machinery room 11. An air outlet port 43 is formed in the ceiling panel 42.

The ice storage chamber 27 includes an inner box 27a and an outer box 27b, and thermally insulating material filling the gap between these boxes. The ice storage chamber 27 has a top opening 47. The ice storage chamber 27 is also provided with a front door 29 and a door mask 30 connected with the door 29 for preventing the ice pieces from spilling from the opposite sides of the door opened.

As shown in FIG. 5, the insides of the upper front ends of the opposite side walls 48 of the ice storage chamber 27 are cut to form step portions 51 for receiving the base 24A or the bottom of the partition 24 of the ice making unit 10. The step portions 51 may be formed at the time the inner box 27a is manufactured. The step portions 51 has depth and length that correspond, respectively, to the thickness and the length of the bottom 24A. The ice making unit 10 is secured on the ice storage chamber 27 by first fitting the ice making unit 10 in the step portions 51 in alignment with the ice storage chamber 27 and then tightening vertical screws 52 penetrating through mounting holes 53 and 54 formed in the thermal insulation partition 24 and the step portions 51, respectively. This establishes firm coupling of ice making unit 10 with the ice storage chamber 27.

After securing the ice making unit 10 on the ice storage chamber 27 in this way, the water receiver 36 is mounted on the ice making unit 10 through the ice storage chamber 27. This may be done by engaging the water receiver 36 with the supporting member 37 on a rear wall 27h of the ice storage chamber 27 and then securing the front end of the water receiver 36 on the base 24A of the partition 24 by screws.

Mounted on 27h, FIG. 2, is an ice level sensor 33 for detecting the amount of the ice stored therein and for controlling ice making operations as required. A drain tube 80 is provided for draining water from ice storage chamber 27.

Procedures for assembling the flow-type ice manufacturing machine will now be described. First, the ice making unit 10 is aligned with the ice storage chamber 27 with the base 24A, FIG. 5, fitted in the step portions 51, and secured by the screws 52. Second, the water receiver 36 is mounted through the ice storage chamber 27. Then, the thermal insulation cover 25 is mounted over the ice making portion 1, to thermally insulate the ice making portion 1 from the surroundings. Finally, the front panel 40, unit panels (not shown), and the ceiling panel 42 are mounted. This completes assemblage of the ice manufacturing machine. It should be noted that the ice making unit 10 thus mounted may be slid on the step portions 51 towards the front end thereof for purposes of, for example, repair and maintenance.

The ice making unit 10 and the ice storage chamber 27 having the above structure have a feature that they may manufactured separately, and may be easily assembled and disassembled.

When assembled, the flange portion 26 protruding from the lower end of the thermal insulation cover 25 extends from the upper end of the inner box 27a of the ice storage chamber 27 to a lower position as shown in FIG. 2, so that water running down on the inner surface of the thermal insulation cover 25 tends to flow to the connecting portions of the cover 25 and ice storage chamber 27, thereby preventing the leakage of water from the ice storage chamber 27 and securely recovering the water within the ice storage chamber 27.

In operation, the compressor 13 circulates coolant through the coolant tube and the cooling pipe 3, which cools the ice making panels 2, which in turn freezes the water scattered from the source-source water sprinkler 4 on the panels and streaming thereon, forming ice pieces i on the panels 2. When a cooling cycle is finished by a controller of the ice manufacturing operation, a hot gas is passed through the cooling pipe 3 for a predetermined period of time. At the same time ice removing water is provided from the ice removal sprinkler 5 to liberate the ice pieces from the ice making panels 2 into the ice storage chamber 27. The ice pieces dropped into the ice storage chamber 27 accumulate in a heap as indicated in FIG. 2 by a double-dotted line, with its apex deep in the ice storage chamber 27. The ice pieces may be scooped out from the front door 29. When the amount (i.e. the height) of the ice decreases to a certain lower level, it is detected by the ice level sensor 33, which generates a signal to resume ice making operation.

Figure 6:
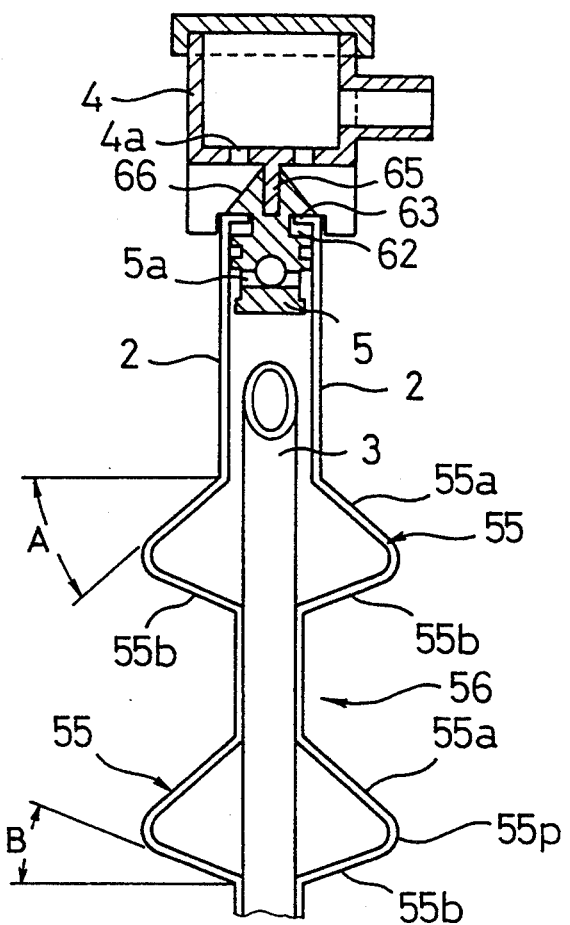
FIG. 6 shows in detail the structure of the ice making panels included in the ice making portion of FIG. 3.
Figure 7:
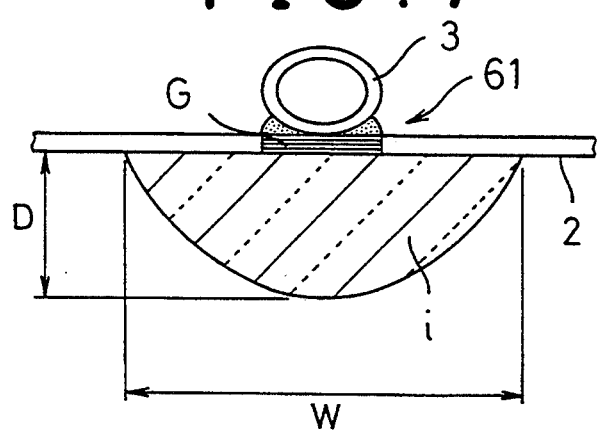
FIG. 7 shows in detail a portion of the ice making panels and the cooling pipe soldered to the panels, with ice formed on the panels.

Referring now to FIGS. 6 and 7, there is shown a third example of the invention with an improved ice making portion having a higher ice making efficiency.

As shown in FIG. 6 the pair of generally vertical ice making panels 2 are made of stainless steel.

The panels are configured to have waving surfaces with crest portions 55 extending horizontally and spaced apart at a predetermined distance. This waving configuration results in formation of a multiplicity of horizontal trough portions or recesses 56 between the neighboring crest portions spaced apart by intervening triangular portions 55.

Ice pieces i are formed in each of the recesses 56, and have an approximately trapezoidal cross section.

The cooling pipe 3 is soldered on the back of each vertical wall of the recesses 56, as shown in FIG. 7.

Since the recesses of the ice making panels 2 are in direct contact with the cooling pipe 3, the recesses 56 are cooled satisfactorily to freeze the water streaming thereinto, resulting in ice pieces i in the recesses. 56. The ice pieces when liberated will drop by gravity. In this case it is important that the ice may come off the panels.

In order to obtain a high ice making efficiency it is also important to allow water to stream uniformly into the recesses 56.

To do so the lower surfaces 55a of the recesses 56 are inclined downward with respect to a horizontal plane so that liberated ice pieces may easily slide down on the surfaces by gravity.

The angle of the inclination of the surfaces 55a is preferably greater than 30 and less than 60. In the example shown herein, the angle is 45.

On the other hand, the water coming down past a crest portion 55p is required to flow smoothly on the entire surface of the subsequent recess immediately below that crest portion 55p. Otherwise, ice will be formed only partially in the recess.

This requirement may be fulfilled by properly inclining the upper surfaces 55b of the recesses 56, which are the lower surfaces 55b of the crests 55.

The efficiency of liberating ice from the panels 2 also depends on the condition that how smoothly the water from the ice removal sprinkler drops on the back sides of the panels 2 during ice liberation operation. From this point it is preferable to provide steep inclination to the upper and lower surfaces 55a, 55b of the recesses 56, respectively. This makes the cross section of the recesses highly asymmetrical. On the other hand, it is preferable from commercial point of view to make the cross section of the ice pieces (i.e. cross section of the recesses) symmetrical such as square or paralellepiped as much as possible, in addition to provide ice pieces having appropriate dimensions. Thus, the angle B of the lower surfaces 55b of the crest portions 44 is preferably in the range between 0° (horizontal), inclusive, and 30°, inclusive. The angle B of the lower surfaces 55b is determined to be smaller in magnitude than the angle A of the upper surface 55a. The angle B in the example shown herein is 15°. It should be understood that if the angles A and B are very large, the ice pieces i will have a large outer dimension for a given weight, and that a compact apparatus will not be obtained since then the ice making portion extends vertically too long.

The top portions or peaks 55p of the crests are curved so that the water may easily flow past the peaks and is led into the recesses. The radius R of the curvature is preferably in the range from 2 mm to 6 mm, inclusive. The radius of the example shown herein is 3.5 mm.

Thus, the angles A and B and the radius R are so determined will ensure smooth flow of the water along the ice making panels 2 as well as smooth liberation of the ice.

To improve ice making efficiency, it is necessary to establish very high heat transfer from the cooling pipe 3 to the ice making panels 2. In the example discussed herein, the ice making panels 2 and the cooling pipe 3 are soldered with each other, as shown in FIG. 7. The Figure illustrates that a substantially semi-cylindrical ice i is coaxially formed along a portion G, where G represents a portion of the cooling pipe and the ice making panels soldered together. The ice making panels 2 may be made of stainless steel such as SUS304.

The thickness of the ice making panels 2 and the cross sectional dimensions (width and the height) of the ice formed are correlated in such a way that the width W of the ice increases while the thickness decreases with the thickness of the ice making panels 2. This is due to the fact that transverse heat conduction along the ice making panels 2 (in the direction parallel to the crests) increases with its thickness but heat conduction in the direction perpendicular to the ice making panels 2 becomes poor. If the thickness of the panels is too great, the ice piece formed must be thin. If the thickness of the panels is too small, necessary mechanical strength may not be obtained. Therefore, in choosing the thickness of the ice making panels, the thickness D of the ice making panels 2 must be compromised for optimum ice manufacturing efficiency and for optimum thickness of the ice. Desirable thickness of the ice making panels 2 ranges from 0.3 mm inclusive to 0.5 mm, inclusive. In the example shown, the thickness D is 0.4 mm.

The solder 81 for brazing the ice making panels 2 and the cooling pipe 8 is required to provide strong bonding between different metals and have good corrosion resistance and good heat conductivity. Further, it should be non-toxic.

The good corrosion resistance of the solder is necessary because the ice making panels 2 and the cooling pipe 3, and hence the solder also, are constantly exposed to water (source water and ice removing water as well) and used in wet conditions.

It should be born in mind that the ice making portion 1 must have good durability against repetitive cooling and heating, since the ice making portion 1 is repeatedly subjected to cooling during ice making operations and heating by hot gas in the cooling pipe 3 during liberation of the ice, which may cause fatigue and deterioration of the ice making portion 1. Particularly, the solder must have acceptable low-temperature characteristics since otherwise it may become brittle at low temperatures.

It is also important that the solder is free of poisonous elements that may dissolve into the source water.

The solder used in the above example containers about 95% of tin as a major component and about 3.5% of silver as a minute additive. Unlike ordinary solders, the solder containing such small amount of silver is known to have excellent low-temperature characteristics in that it has only reduced low-temperature brittleness. Either antimony or cadmium may be alternatively added to the solder in place of silver. All or part of these three metals may be added to the solder with a suitable proportion.

The cooling pipe 3 may be a copper tube having grooves on the inside thereof. The outer surface of the tube may be plated by tin. The cooling pipe 3 may be slightly flattened in cross section by a press so that it may be blazed easily by solder 61 and that it has larger heat transfer area. The ice making panels 2 may be acid-treated to enhance affinity with the solder and coated with hydrophilic paint after it is soldered so as to have improve affinity with flowing water.

Both the ice removal sprinkler 5 and the source-water sprinkler 4 may be made of plastic materials. The ice removal sprinkler 5 has holes 5a in the opposite sides for sprinkling water, and engagement grooves 62 in the form of slit provided in the sides and above the holes 5a. By fitting into the slits 62 the flanges 63 that extends inwardly, the ice removal sprinkler 5 may be mounted between the ice making panels 2. The source-water sprinkler 4 is coupled with the ice removal sprinkler 5 by mating their corresponding recesses and protrusions 65. The water sprinkled from holes 4a will streams down on the surfaces 66 and the ice making panels 2. The surfaces 66 are ground by Scotch Brite in the horizontal direction to enhance its affinity with water so that uniform thin laminar flow of water may be obtained on the surfaces.

Figure 8:
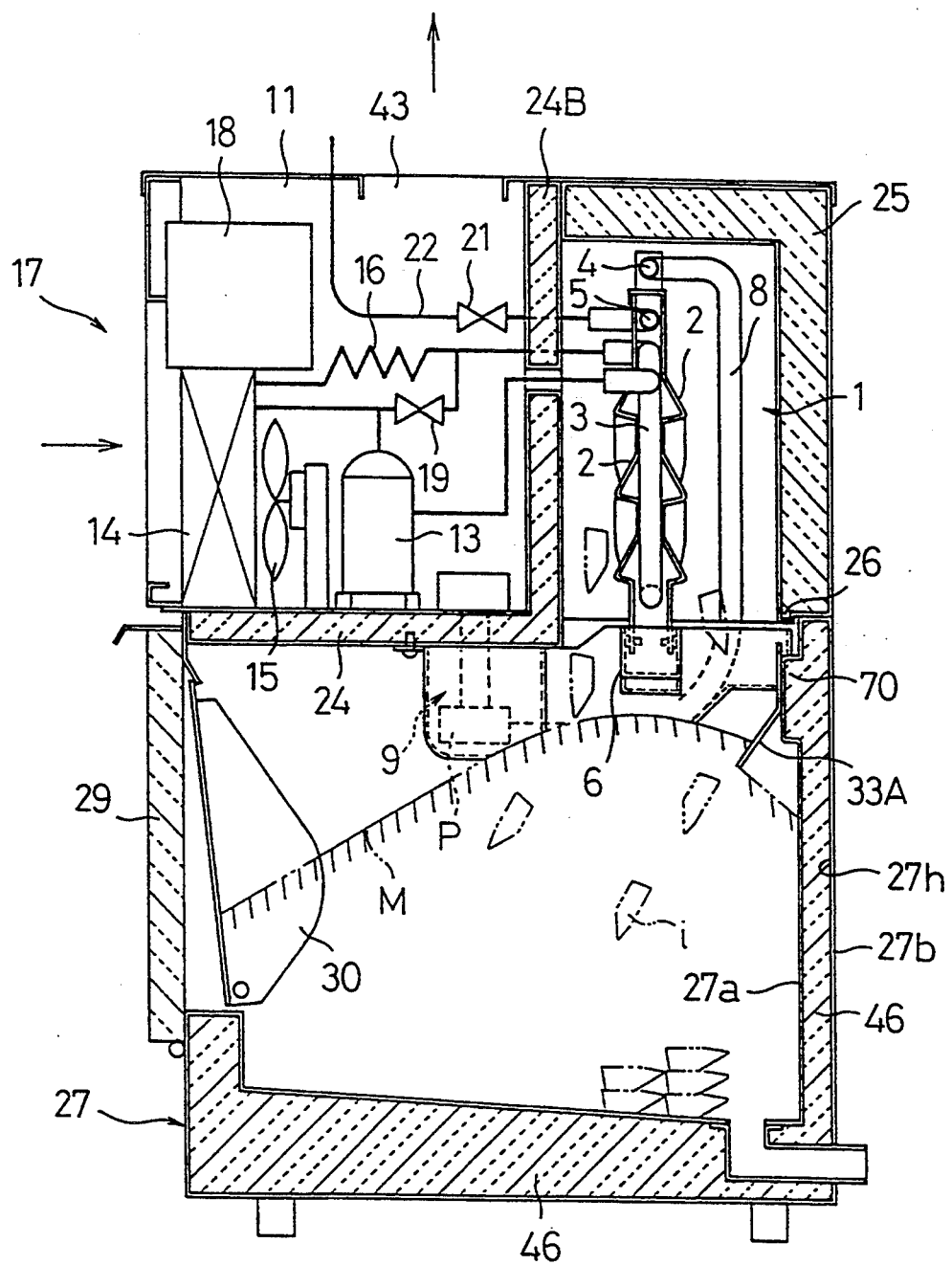
FIG. 8 is a vertical cross section of the flow-type ice manufacturing machine, with a capacitor-type ice level sensor installed on the rear wall of the ice storage chamber.
Figure 11:
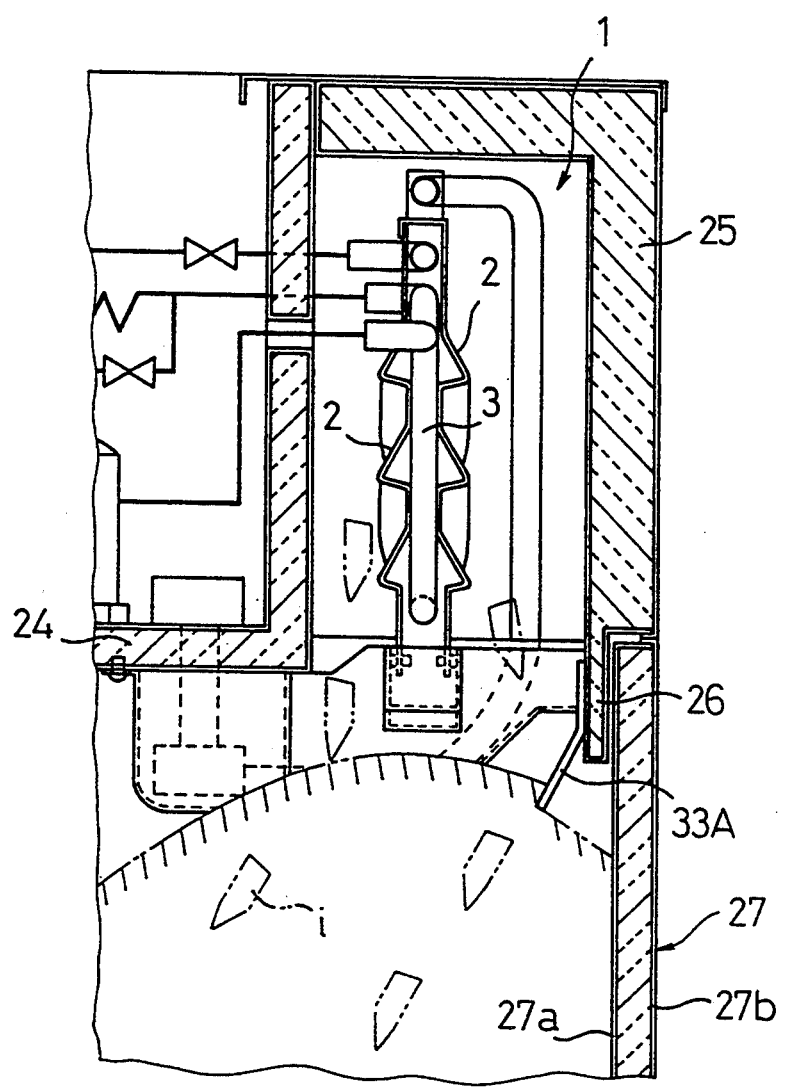
FIG. 11 is a partial cross section of the ice storage chamber, showing an alternative position of the ice level sensor.

Referring to FIGS. 8 and 11, a fourth example of the invention will be now described.

In the same manner as discussed in the second example, the condenser unit 17 and the ice making portion 1 are mounted on the thermal insulation partition 24 to form an integral ice making unit 10. The ice making portion 1 is provided with the thermally insulating cover 25, which renders the ice making portion 1 thermally insulated from the surroundings.

Figure 10:
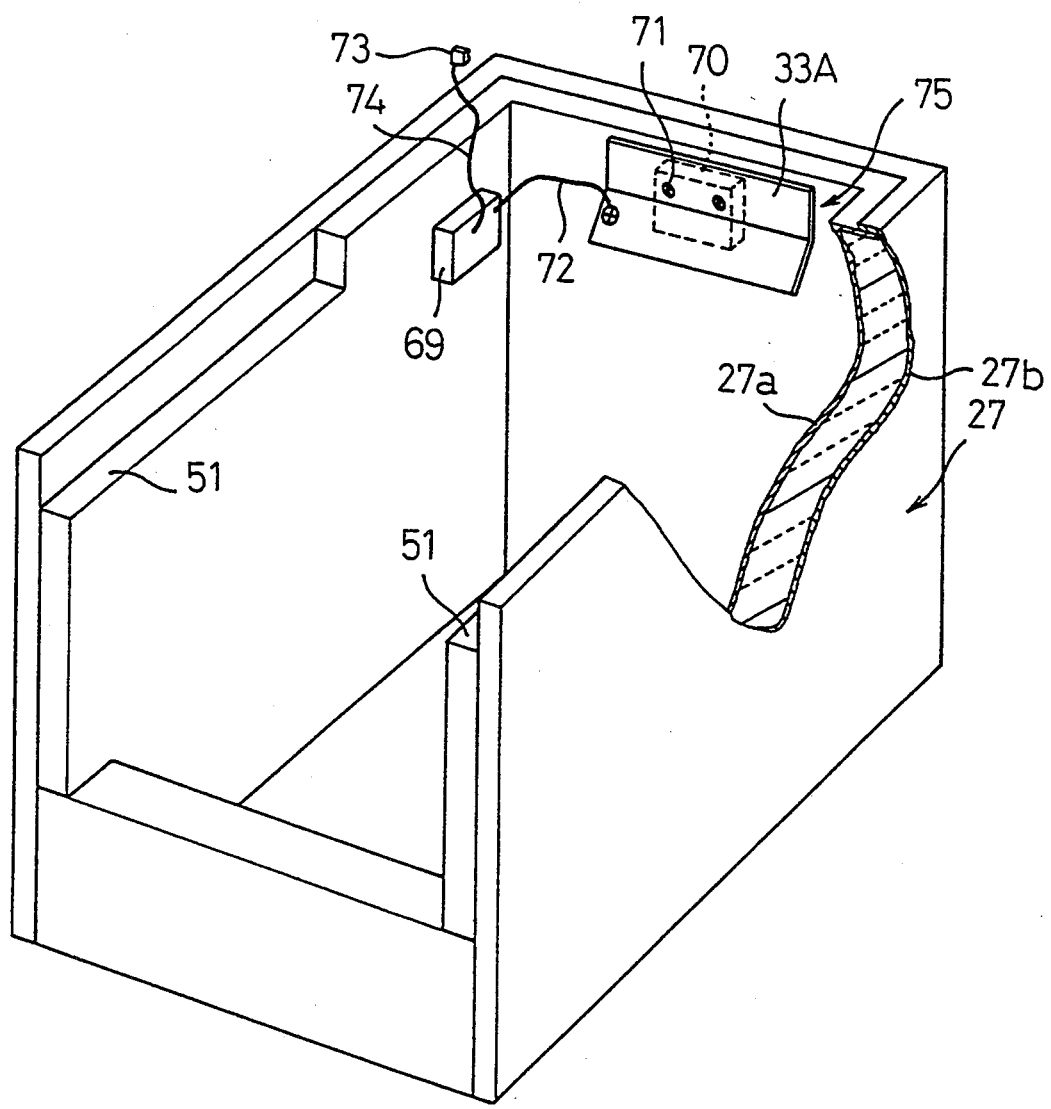
FIG. 10 is a perspective view of the ice storage chamber with the ice level sensor mounted thereon.

On the other hand, the ice storage chamber 27 comprises an internal box 27a, a stainless steel outer box 27b, and an expanded thermal insulation material 46 filling the space between the internal and outer boxes, and has step portions 51 at its upper opening. The ice making unit 10 is firmly connected with the ice storage chamber 27 by fitting the bottom of the thermally insulating base 24a of the partition 24 into the step portions 51 and firmly securing them by screws 52. A front part of the upper opening of the ice storage chamber 27 is thus covered by the condenser unit 17, leaving the rear portion of the upper opening of the ice storage chamber 27 open so that the ice pieces i dropping from the ice making portion 1 may fall directly into the ice storage chamber 27 and accumulate deep in the ice storage chamber 27, forming in a heap of ice pieces as indicated in FIG. 8 by a shaded outline. Therefore, a capacitor-type ice level sensor 33A for sensing the level or amount of the ice and generating a signal to control ice making operation is provided in the rear portion of the ice storage chamber 27. The capacitor type sensor 33A is connected with a processor 69 for processing the signal generated by the ice level sensor 33A, as shown in FIG. 10. In order to position the sensor 33A off the inner wall 27h, it is mounted on a protruding portion of the rear wall 27h of the ice storage chamber 27. The protrusion may be easily fabricated when the plastic inner wall is molded. The other electrode of the capacitor type sensor 33A may be the outer box 27b itself which is made of stainless steel.

The capacitance C of the condenser or the sensor 33A increases with the amount of the ice in the ice storage chamber 27. The change in the capacitor is transmitted as an input signal to the processor 69 via a line 72, which in turn provides a control circuit with a signal via a signal line 74 having a connector 73. As the level of the ice reaches a predetermined height, the signal causes the current ice making operation to be stopped.

Figure 9:
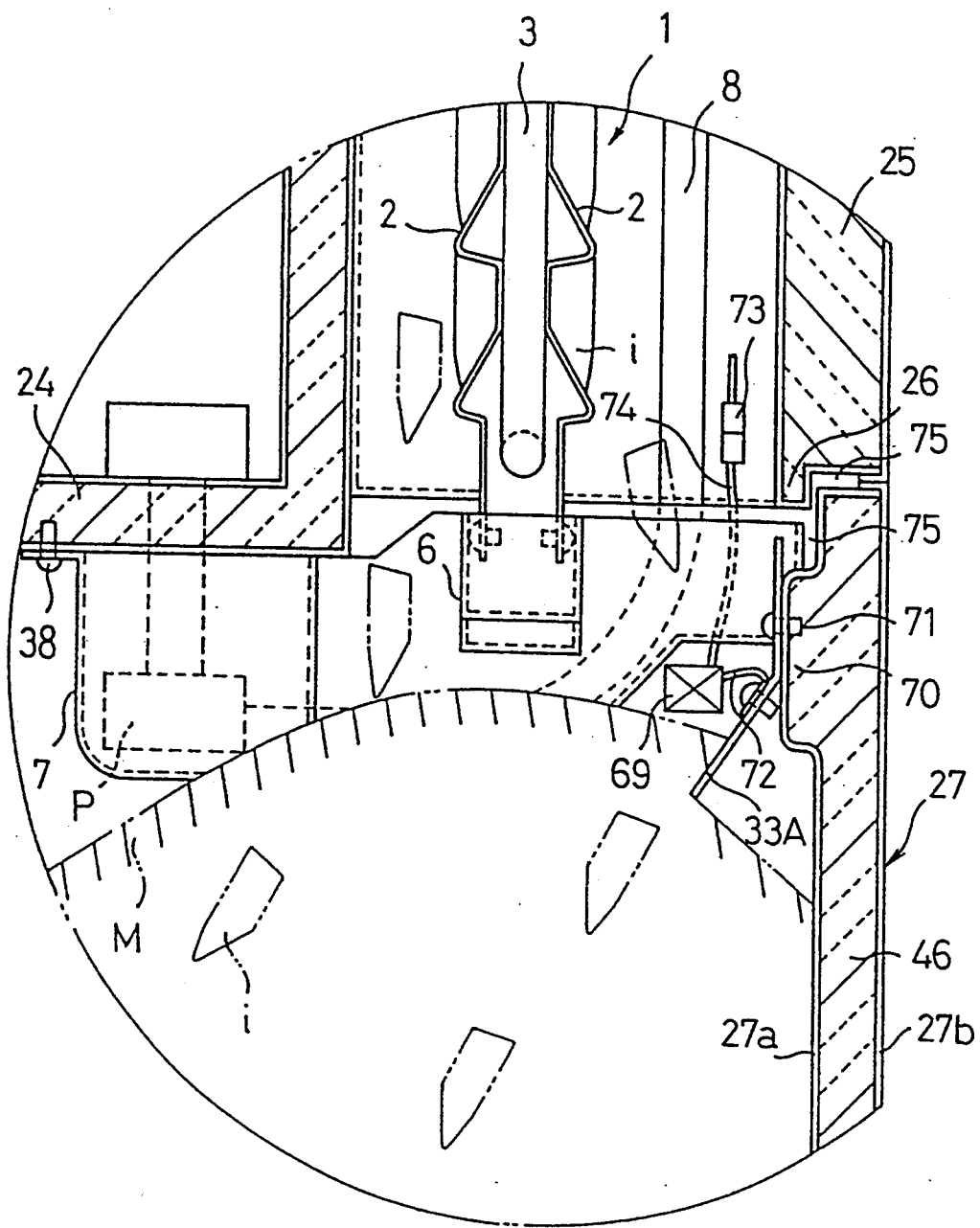
FIG. 9 is an enlarged cross section of the connecting portions of the flow-type ice manufacturing machine bearing the capacitor-type ice level sensor.

Provided between the connecting portions of the thermal insulation cover 25 and the ice storage chamber 27 is a space or gap 75, as clearly indicated in FIG. 9. The gap 75 ensures electrical insulation between the thermal insulation cover 25 and the ice storage chamber 27 if a little amount of deposit lies in the connection portions. The ice level sensor would be otherwise short-circuited by the deposit with the outer metal surface of the ice storage and would undergo an erroneous detection of the ice level.

Step configuration provided at the lower ends of the thermal insulation cover 25 assists the water coming down on the cover 25 to drop off from lower ends, so that the water may be recovered to the ice storage chamber 27. The step configuration also prevents the water from entering the space beneath the thermal insulation cover 25, and accumulating deposit in the space. FIG. 11 illustrates an alternative position of the ice level sensor 33A.

In this example the thermal insulation cover 25 is provided with a flange portion 26 which depends from the connecting portion of the thermal insulation cover 25 inside the ice storage chamber 27. The ice level sensor 33A may be mounted on the flange portion 26 so that the sensor 33A is positioned away from the ice storage chamber 27, thereby preventing short-circuiting the sensor 33A due to deposit accumulating between the sensor 33A and the ice storage chamber 27.

We claim:

1. A flow-type ice manufacturing machine including substantially vertical ice making panels having ice making surfaces and equipped with a cooling pipe secured on the back sides of said ice making panels for cooling circulating water that flows on said ice making surfaces, said ice manufacturing machine comprising:

an ice making room for accommodating said ice making panels and a source-water sprinkler mounted above said ice making panels;

said source-water sprinkler including a first sprinkler for sprinkling water on said ice making surfaces for forming ice on said ice making surfaces and a second sprinkler for sprinkling sprinkling water on said ice formed on said ice forming surfaces for removing and discharging said formed ice from said surfaces;

a machinery room for accommodating a condensation unit connected with said cooling pipe to form a cooling cycle; and an ice storage chamber for storing ice formed by said ice making panels and discharged from said ice forming surfaces, said ice storage chamber having a door at a front of said ice storage chamber for providing users with access to ice stored in said chamber, said chamber having a front portion adjacent said door and a rear portion, said machinery room being mounted above said front portion of said ice storage chamber; and said ice making chamber being mounted above said rear portion of said ice storage chamber, said ice removed and discharged from said ice forming surfaces being discharged into said rear portion of said ice storage chamber.

2. A flow-type ice manufacturing machine as claimed in claim 1, further comprising an ice level sensor mounted on the rear wall of said ice storage chamber for controlling the ice making operation of said ice manufacturing machine in accordance with the amount of the ice stocked in said ice storage chamber.

* * * * *